United States Patent
Zhang (10) Patent No.: US 11,444,844 B2
(45) Date of Patent: Sep. 13, 2022

(54) SIMULATING A DYNAMIC HYBRID NETWORK

(71) Applicant: SoftBank Corp., Tokyo (JP)

(72) Inventor: Jin Zhang, Mountain View, CA (US)

(73) Assignee: SoftBank Corp., Tokyo (JP)

( * ) Notice: Subject to any disclaimer, the term of this patent is extended or adjusted under 35 U.S.C. 154(b) by 148 days.

(21) Appl. No.: 17/069,582

(22) Filed: Oct. 13, 2020

(65) Prior Publication Data
US 2022/0116280 A1    Apr. 14, 2022

(51) Int. Cl.
*H04L 41/14* (2022.01)
*H04W 24/06* (2009.01)
*H04W 84/06* (2009.01)
*H04W 84/18* (2009.01)

(52) U.S. Cl.
CPC .......... *H04L 41/145* (2013.01); *H04W 24/06* (2013.01); *H04W 84/06* (2013.01); *H04W 84/18* (2013.01)

(58) Field of Classification Search
CPC ..... H04L 41/14; H04L 41/142; H04L 41/145; H04L 41/147; H04W 24/00; H04W 24/02; H04W 24/06; H04W 24/08; H04W 24/10; H04W 84/005; H04W 84/06; H04W 84/18
See application file for complete search history.

(56) References Cited

U.S. PATENT DOCUMENTS 9,524,648 B1 * 12/2016 Gopalakrishnan ...... G06F 21/00
9,622,277 B1 *  4/2017 Sun ....................... H04W 40/20
2007/0008927 A1 *  1/2007 Herz ..................... H04W 84/18
                                                  370/331
2009/0238095 A1 *  9/2009 Blackwell ............. H04W 24/08
                                                  370/254
2011/0286325 A1 * 11/2011 Jalali ................... H04B 7/18584
                                                  370/221

(Continued)

FOREIGN PATENT DOCUMENTS

CA    3043686 A1 * 1/2020 ............ G01C 19/36
CA    3054521 A1 * 3/2020 ......... G02B 27/0093

OTHER PUBLICATIONS

The International Search Report and The Written Opinion of the International Searching Authority for PCT/JP2021/033998, dated Dec. 22, 2021.

(Continued)

*Primary Examiner* — Kevin D Mew
(74) *Attorney, Agent, or Firm* — Botos Churchill IP Law (57) ABSTRACT

The technology relates to simulating a dynamic hybrid network. A method for simulating a dynamic hybrid network includes modeling a transmission supply of a mesh network of moving stations on aerial vehicles in flight at each time step in a time series, modeling capacity demand as a function of user distribution data and user behavior data, and computing an aggregate network metric for the dynamic hybrid network including throughput. A method for optimizing throughput of a dynamic hybrid network includes modeling a dynamic hybrid network, including a transmission supply of a mesh network of moving stations, modeling capacity demand as a function of user distribution data and user behavior data, and computing an aggregate network metric; then providing feedback to a controller and causing a change to a station in the network to increase throughput.

17 Claims, 9 Drawing Sheets

(56) References Cited

U.S. PATENT DOCUMENTS

| | | | |
|---|---|---|---|
| 2013/0099941 A1* | 4/2013 | Jana | G08G 1/096716 |
| | | | 340/905 |
| 2016/0080257 A1* | 3/2016 | Farmanbar | H04W 28/021 |
| | | | 370/236 |
| 2017/0069214 A1* | 3/2017 | Dupray | G08G 5/0021 |
| 2018/0035306 A1* | 2/2018 | Zavesky | H04B 7/18506 |
| 2018/0060476 A1* | 3/2018 | Kasch | G06F 30/392 |
| 2018/0075759 A1* | 3/2018 | Kim | G08G 1/096827 |
| 2018/0292826 A1* | 10/2018 | DeFelice | G05D 1/0088 |
| 2018/0293897 A1 | 10/2018 | Murphy | |
| 2019/0138934 A1* | 5/2019 | Prakash | G06K 9/6257 |
| 2019/0306675 A1 | 10/2019 | Xue et al. | |
| 2019/0320494 A1* | 10/2019 | Jayawardene | H04L 12/2803 |
| 2019/0363429 A1 | 11/2019 | Martin, II et al. | |
| 2020/0162336 A1 | 5/2020 | Gonguet | |
| 2020/0204477 A1* | 6/2020 | Rahman | H04L 47/822 |
| 2020/0229206 A1* | 7/2020 | Badic | H04W 16/32 |
| 2021/0399791 A1* | 12/2021 | Byrne | G08G 5/0008 |

OTHER PUBLICATIONS

Boccadoro, et al., "Internet of Drones: a Survey on Communications, Technologies, Protocols, Architectures and Services," arxiv.org, Cornell University Library, NY, 2020.

Fotouhi, et al., "Survey on UAV Cellular Communications: Practical Aspects, Standardization Advancements, Regulation, and Security Challenges," IEEE Communication Surveys & Tutorials, vol. 21, No. 4, 2019, pp. 3417-3442.

\* cited by examiner

SIMULATING A DYNAMIC HYBRID NETWORK

BACKGROUND OF INVENTION

Conventional modeling of cellular and broadband network capabilities are often based on manual measurements of signals from telecommunications towers sampled infrequently. Typical cellular and broadband network infrastructure is ground based and unmoving, so conventional models of cellular and broadband networks assume a static network of stations that are fixed in place and have antennas pointed in fixed directions. Conventional telecommunications networks being fixed in place also means that the only adjustments that can be made to stations are tuning antennas in their fixed locations.

A network of stations carried by aerial vehicles allow for changes to locations of stations, as well as directing network signals according to need and desire (i.e., demand). Given the near constant movement of the aerial vehicle stations, particularly with transmitters on gimbals that can direct signals in a wide range of directions relative to a position of an aerial vehicle, it is not possible to use conventional modeling techniques to capture the time varying dynamics of a hybrid network composed of moving stations (i.e., on aerial vehicles) and ground stations.

Thus, improved techniques for simulating a dynamic hybrid network is desirable.

BRIEF SUMMARY

The present disclosure provides techniques for simulating a dynamic hybrid network. A method for simulating a dynamic hybrid network may include: modeling, at each time step in a time series, a transmission supply of a mesh network of a plurality of moving stations on a plurality of aerial vehicles in flight, including modeling point-to-point radio wave transmission capacity; modeling capacity demand as a function of user distribution data and user behavior data; and computing, at each time step, an aggregate network metric for the dynamic hybrid network comprising at least a throughput. In some examples, the dynamic hybrid network comprises the mesh network and one or more fixed stations. In some examples, the method may further comprise modeling the transmission supply of the mesh network relative to the transmission supply of the one or more fixed stations. In some examples, the plurality of aerial vehicles comprises more than one type of aerial vehicle. In some examples, the mesh network comprises a homogeneous network of LTE stations. In some examples, the mesh network comprises a heterogeneous network of two or more types of stations. In some examples, the method further comprises modeling multi-station interference among the mesh network of the plurality of moving stations. In some examples, the method further comprises modeling multi-station interference between the mesh network and one or more fixed stations. In some examples, the aggregate network metric is based on a signal quality per handset output from modeling the transmission supply and a capacity demand per handset output from modeling the capacity demand. In some examples, modeling the capacity demand results in a cyclical representation of a capacity demand per handset. In some examples, modeling the capacity demand results in a static representation of a capacity demand per handset. In some examples, the method further comprises outputting a simulated dynamic hybrid network using the aggregate network metric. In some examples, the simulated dynamic hybrid network is represented using a heatmap.

A method for optimizing throughput of a dynamic hybrid network may include: modeling a dynamic hybrid network, including modeling a transmission supply of a mesh network of moving stations at each time step in a time series, modeling capacity demand as a function of user distribution data and user behavior data, and computing an aggregate network metric comprising at least a throughput; providing feedback to a controller, the feedback comprising at least the throughput; and causing, by the controller, a change to one, or a combination of, a location, direction, and transmission strength of a station in the network, the change configured to increase the throughput. In some examples, modeling the dynamic hybrid network comprises performing a regression analysis over a series of locations from an actual vehicle trajectory. In some examples, modeling the dynamic hybrid network comprises performing a regression analysis over a series of locations from a simulated vehicle trajectory. In some examples, modeling the transmission supply comprises modeling point-to-point transmission between a plurality of stations in the dynamic hybrid network and a handset density. In some examples, the station is located on an aerial vehicle. In some examples, the aerial vehicle is part of a fleet of aerial vehicles carrying the mesh network of moving stations. In some examples, the station is part of a self-organizing network (SON) and is configured to adjust an antenna characteristic in response to information received from another station.

BRIEF DESCRIPTION OF THE DRAWINGS

Various non-limiting and non-exhaustive aspects and features of the present disclosure are described herein below with references to the drawings, wherein.

The figures depict various example embodiments of the present disclosure for purposes of illustration only. One of ordinary skill in the art will readily recognize from the following discussion that other example embodiments based on alternative structures and methods may be implemented without departing from the principles of this disclosure, and which are encompassed within the scope of this disclosure.

DETAILED DESCRIPTION

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

The above and other needs are met by the disclosed methods, a non-transitory computer-readable storage medium storing executable code, and systems for dispatching fleets of aircraft by a fleet management and flight planning system. The terms "aerial vehicle" and "aircraft" are used interchangeably herein to refer to any type of vehicle capable of aerial movement, including, without limitation, High Altitude Platforms (HAPs), High Altitude Long Endurance (HALE) aircraft, unmanned aerial vehicles (UAVs), passive lighter than air vehicles (e.g., floating stratospheric balloons, other floating or wind-driven vehicles), powered lighter than air (LTA) vehicles (e.g., balloons and airships with some propulsion capabilities), fixed-wing vehicles (e.g., drones, rigid kites, gliders), various types of satellites, rockets, space stations, and other high altitude aerial vehicles.

The invention is directed to simulating a dynamic hybrid network by combining a precise model of a dynamic hybrid network (i.e., supply model) with a demand model. The dynamic hybrid network model comprises a model of a ground network and a model of an evolving mesh network of aerial vehicles (i.e., LTE-enabled or otherwise equipped to provide data connectivity) that are near constantly moving. The mesh network of aerial vehicles may represent a distribution and access layer of the network. Each aerial vehicle may carry one, two or more communications station (s), with transceivers generally facing out (e.g., from a central axis) of the aerial vehicle. The transceivers may comprise terminals that pivot on a gimbal, providing a wide range of directional capabilities. The mesh network of aerial vehicles comprises a moving network of stations with variable directional capabilities.

A method of modeling the dynamic hybrid network comprises, at each time step in a time series, modeling a transmission supply of the mesh network of aerial vehicles, modeling capacity demand, and computing aggregate network metrics, including throughput (e.g., in megabytes per second or other transmission volume per time scale) and number of users served. Some or all of the aggregate network metrics may indicate how well supply matches with demand and may be provided as feedback to a fleet management system to alter (e.g., by a controller) a station location, direction, and transmission strength, to improve the aggregate network metrics (e.g., to tune throughput to equal or smaller than demand).

Modeling the transmission supply of the mesh network may include modeling point-to-point radio wave transmission capacity, a point being a base station and another point being a handset density at a location (e.g., abstract representation of handset density). Modeling the transmission supply of the mesh network also may include modeling multi-station interference (i.e., interference between fixed stations and current and/or forecasted locations of moving stations), including one or both downlink (i.e., station to handset) and uplink (i.e., handset to station). In some examples, modeling the transmission supply further may include modeling individual radio frequency transmissions from each station to each handset. Modeling the transmission supply may be based on a plurality of antenna characteristics (e.g., direction, location, frequency, signal transmission pattern (i.e., lobes), signal transmission strength).

An output of a transmission supply model may comprise a signal quality per handset metric (e.g., signal to interference plus noise ratio (SINR), received signal strength indicator (RSSI), reference signal received power (RSRP), reference signal received quality (RSRQ)) for each time step in a time series. Another output of a transmission supply model may comprise a heat map indicating strength of signal at each point on a map of a location or area of interest.

The capacity demand may be modeled as a function of user distribution data and user behavior data (e.g., anonymized usage data), the output of which may comprise a capacity demand per handset at each point in a plurality of points representing a geographical location or area of interest. User behavior data may be geographically distinct (e.g., differ significantly from one area or country to another). Demand may be static or may vary in time (e.g. having a day-night cycle).

Resulting aggregated network metrics are calculated for each time step, as the transmission supply model may change with each time step, as described above, due to changes in positions and orientations of base stations (e.g., LTE base stations) in the network.

In some examples, the network may be an LTE network or other single standard network operating on a same frequency band, wherein adjacent LTE stations will interfere with each other. In some examples, each aerial vehicle may house multiple LTE stations.

Example System

Figure 1A:
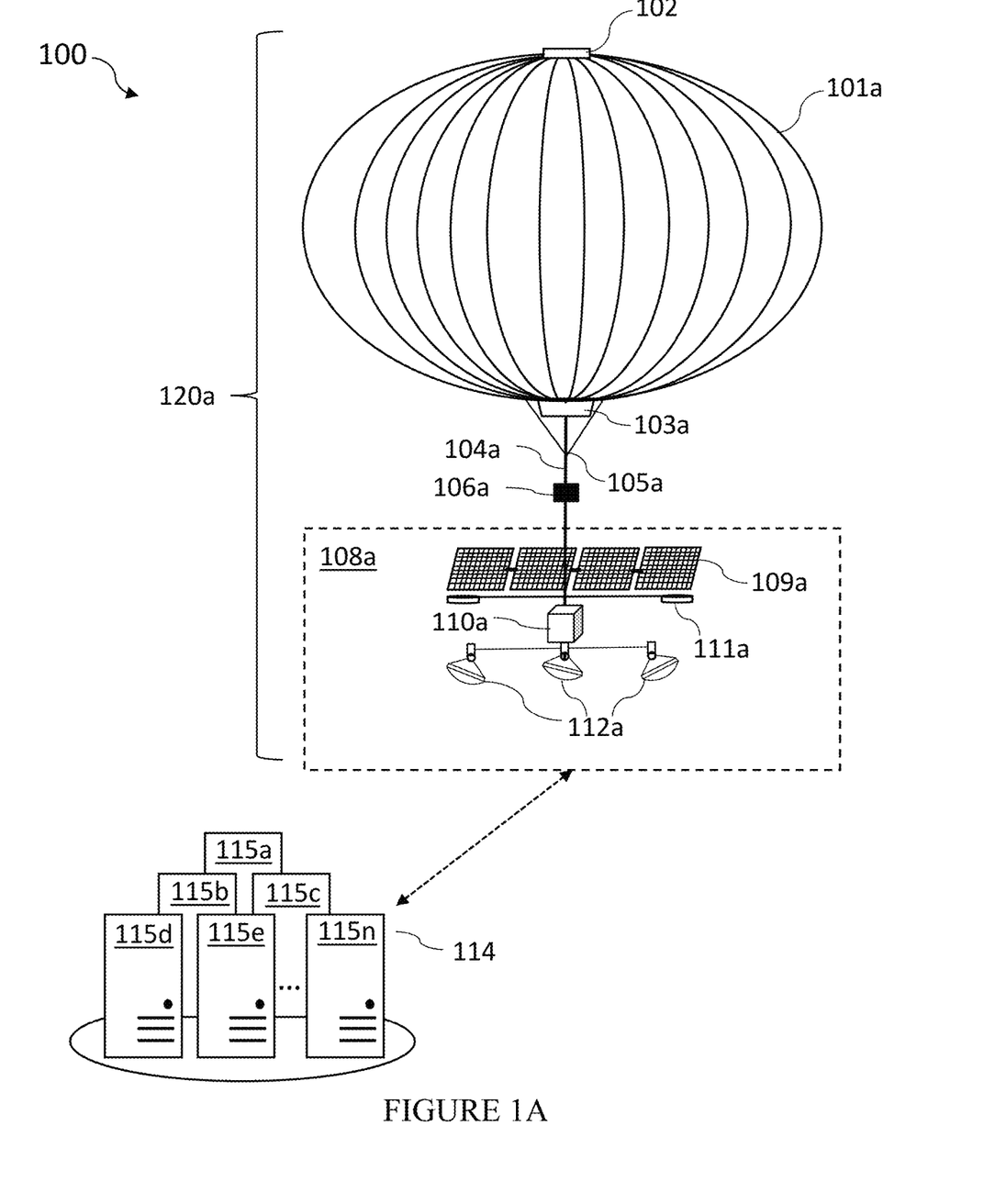
FIGS. 1A-1B are diagrams of exemplary aerial vehicles which may carry communications stations in a dynamic hybrid network, in accordance with one or more embodiments.
Figure 1B:
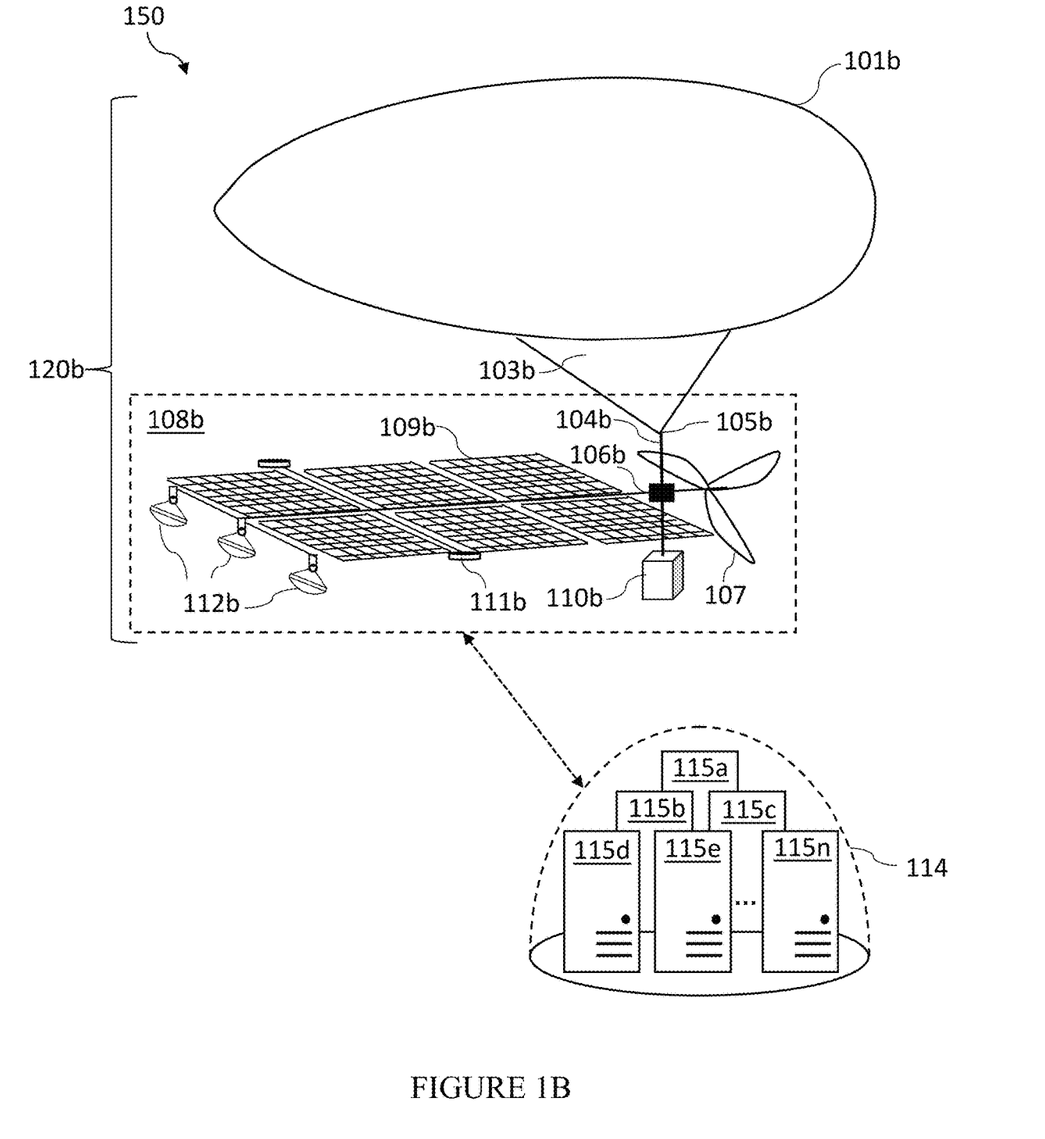

FIGS. 1A-1B are diagrams of exemplary aerial vehicle systems, which may carry communications stations in a dynamic hybrid network, in accordance with one or more embodiments. In FIG. 1A, there is shown a diagram of system 100 for control and navigation of aerial vehicle 120a, which may carry communication stations (e.g., communications units 111a, terminals 112a, and other components that serve to enable wireless communication with other parts of the network) of a dynamic hybrid network. In some examples, aerial vehicle 120a may be a passive vehicle, such as a balloon or satellite, wherein most of its directional movement is a result of environmental forces, such as wind and gravity. In other examples, aerial vehicles 120a may be actively propelled. In an embodiment, system 100 may include aerial vehicle 120a and ground station 114. In this embodiment, aerial vehicle 120a may include balloon 101a, plate 102, altitude control system (ACS) 103a, connection 104a, joint 105a, actuation module 106a, and payload 108a. In some examples, plate 102 may provide structural and electrical connections and infrastructure. Plate 102 may be positioned at the apex of balloon 101a and may serve to couple together various parts of balloon 101a. In other examples, plate 102 also may include a flight termination unit, such as one or more blades and an actuator to selectively cut a portion and/or a layer of balloon 101a. In other examples, plate 102 further may include other electronic components (e.g., a sensor, a part of a sensor, power source, communications unit). ACS 103a may include structural and electrical connections and infrastructure, including components (e.g., fans, valves, actuators, etc.) used to, for example, add and remove air from balloon 101a (i.e., in some examples, balloon 101a may include an interior ballonet within its outer, more rigid shell that may be inflated and deflated), causing balloon 101a to ascend or descend, for example, to catch stratospheric winds to move in a desired direction. Balloon 101a may comprise a balloon envelope comprised of lightweight and/or flexible latex or rubber materials (e.g., polyethylene, polyethylene terephthalate, chloroprene), tendons (e.g., attached at one end to plate 102 and at another end to ACS 103a) to provide strength and stability to the balloon structure, and a ballonet, along with other structural components. In various embodiments, balloon 101a may be non-rigid, semi-rigid, or rigid.

Connection 104a may structurally, electrically, and communicatively, connect balloon 101a and/or ACS 103a to various components comprising payload 108a. In some examples, connection 104a may provide two-way communication and electrical connections, and even two-way power connections. Connection 104a may include a joint 105a, configured to allow the portion above joint 105a to pivot about one or more axes (e.g., allowing either balloon 101a or payload 108a to tilt and turn). Actuation module 106a may provide a means to actively turn payload 108a for various purposes, such as improved aerodynamics, facing or tilting solar panel(s) 109a advantageously, directing payload 108a and propulsion units (e.g., propellers 107 in FIG. 1B) for propelled flight, or directing components of payload 108a advantageously.

Payload 108a may include solar panel(s) 109a, avionics chassis 110a, broadband communications unit(s) 111a, and terminal(s) 112a, as well as other components to enable a communications station in the dynamic hybrid network. Solar panel(s) 109a may be configured to capture solar energy to be provided to a battery or other energy storage unit, for example, housed within avionics chassis 110a. Avionics chassis 110a also may house a flight computer (e.g., computing device 301, as described herein), a transponder, along with other control and communications infrastructure (e.g., a controller comprising another computing device and/or logic circuit configured to control aerial vehicle 120a). Communications unit(s) 111a may include hardware to provide wireless network access (e.g., LTE, fixed wireless broadband via 5G, Internet of Things (IoT) network, free space optical network or other broadband networks). Terminal(s) 112a may comprise one or more parabolic reflectors (e.g., dishes) coupled to an antenna and a gimbal or pivot mechanism (e.g., including an actuator comprising a motor). Terminal(s) 112(a) may be configured to receive or transmit radio waves to beam data long distances (e.g., using the millimeter wave spectrum or higher frequency radio signals). In some examples, terminal (s) 112a may have very high bandwidth capabilities. Terminal(s) 112a also may be configured to have a large range of pivot motion for precise pointing performance. Terminal (s) 112a also may be made of lightweight materials.

In other examples, payload 108a may include fewer or more components, including propellers 107 as shown in FIG. 1B, which may be configured to propel aerial vehicles 120a-b in a given direction. In still other examples, payload 108a may include still other components well known in the art to be beneficial to flight capabilities of an aerial vehicle. For example, payload 108a also may include energy capturing units apart from solar panel(s) 109a (e.g., rotors or other blades (not shown) configured to be spun, or otherwise actuated, by wind to generate energy). In another example, payload 108a may further include or be coupled to an imaging device, such as a downward-facing camera and/or a star tracker. In yet another example, payload 108a also may include various sensors (not shown), for example, housed within avionics chassis 110a or otherwise coupled to connection 104a or balloon 101a. Such sensors may include Global Positioning System (GPS) sensors, wind speed and direction sensors such as wind vanes and anemometers, temperature sensors such as thermometers and resistance temperature detectors (i.e., RTDs), speed of sound sensors, acoustic sensors, pressure sensors such as barometers and differential pressure sensors, accelerometers, gyroscopes, combination sensor devices such as inertial measurement units (IMUs), light detectors, light detection and ranging (LIDAR) units, radar units, cameras, other image sensors, and more. These examples of sensors are not intended to be limiting, and those skilled in the art will appreciate that other sensors or combinations of sensors in addition to these described may be included without departing from the scope of the present disclosure.

Figure 3A:
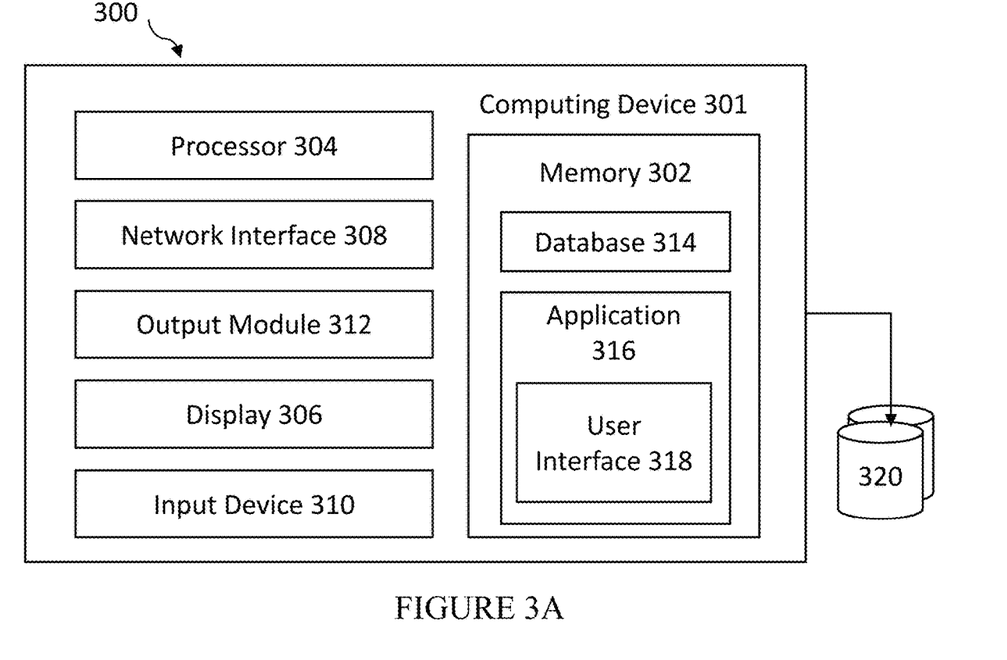
FIG. 3A is a simplified block diagram of an exemplary computing system forming part of the systems of FIGS. 1A-2, in accordance with one or more embodiments.

Ground station 114 may include one or more server computing devices 115a-n, which in turn may comprise one or more computing devices (e.g., computing device 301 in FIG. 3). In some examples, ground station 114 also may include one or more storage systems, either housed within server computing devices 115a-n, or separately (see, e.g., computing device 301 and repositories 320). Ground station 114 may be a datacenter servicing various nodes of one or more networks (e.g., aerial vehicle network 200 in FIG. 2).

FIG. 1B shows a diagram of system 150 for control and navigation of aerial vehicle 120b. All like-numbered elements in FIG. 1B are the same or similar to their corresponding elements in FIG. 1A, as described above (e.g., balloon 101a and balloon 101b may serve the same function, and may operate the same as, or similar to, each other). In some examples, balloon 101b may comprise an airship hull or dirigible balloon. In this embodiment, aerial vehicle 120b further includes, as part of payload 108b, propellers 107, which may be configured to actively propel aerial vehicle 120b in a desired direction, either with or against a wind force to speed up, slow down, or re-direct, aerial vehicle 120b. In this embodiment, balloon 101b also may be shaped differently from balloon 101a, to provide different aerodynamic properties. In some examples, balloon 101b may include one or more fins (not shown) coupled to one or more of a rear, upper, lower, or side, surface (i.e., relative to a direction in which balloon 101b is heading).

As shown in FIGS. 1A-1B, aerial vehicles 120a-b may be largely wind-influenced aerial vehicles, for example, balloons carrying a payload (with or without propulsion capabilities) as shown, or fixed wing high altitude drones (e.g., aerial vehicle 211c in FIG. 2) with gliding and/or full propulsion capabilities. However, those skilled in the art will recognize that the systems and methods disclosed herein may similarly apply and be usable by various other types of aerial vehicles.

Figure 2:
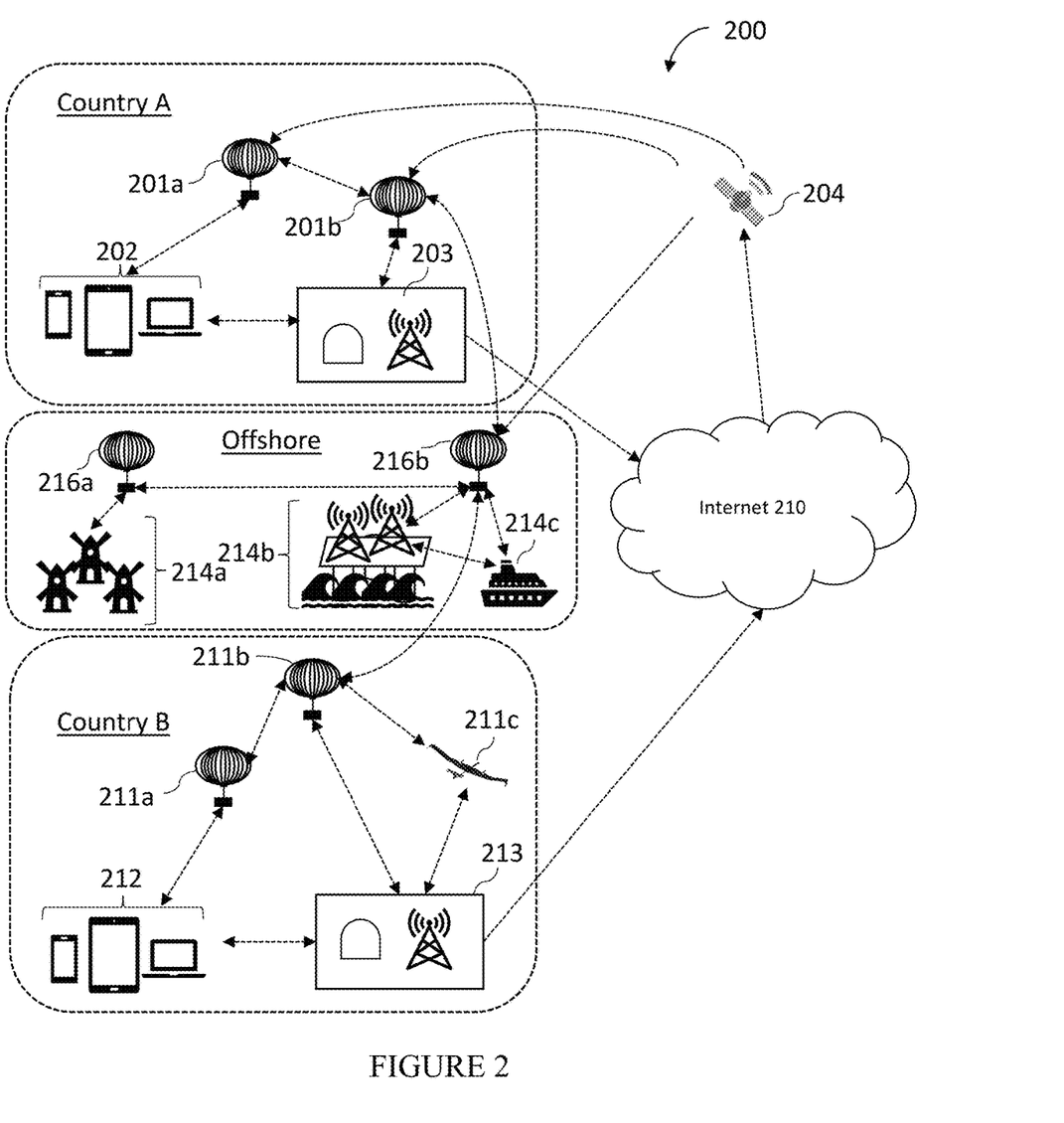
FIG. 2 is a diagram of an exemplary hybrid network, in accordance with one or more embodiments.

FIG. 2 is a diagram of an exemplary hybrid network, in accordance with one or more embodiments. Hybrid network 200 may include aerial vehicles 201a-b, user devices 202, and ground infrastructure 203, in Country A. Hybrid network 200 also may include aerial vehicles 211a-c, user devices 212, and ground infrastructure 213 in Country B. Hybrid network 200 also may include offshore facilities 214a-c and aerial vehicles 216a-b servicing at least said offshore facilities 214a-c. Hybrid network 200 may further include satellite 204 and Internet 210. Aerial vehicles 201a-b, 211a-c, and 216a-b may comprise balloon, other floating (i.e., lighter than air), propelled or partially propelled (i.e., propelled for a limited amount of time or under certain circumstances, and not propelled at other times or under other circumstances), fixed-wing, or other types of high altitude aerial vehicles, as described herein. For example, aerial vehicles 201a-b, 211a-c, and 216a-b may be the same or similar to aerial vehicles 120a-b described above. User devices 202 and 212 may include a cellular phone, tablet computer, smart phone, desktop computer, laptop computer, and/or any other computing device known to those skilled in the art. Ground infrastructure 203 and 213 may include always-on or fixed location computing device (i.e., capable of receiving fixed broadband transmissions), ground terminal (e.g., ground station 114), tower (e.g., a cellular tower), and/or any other fixed or portable ground infrastructure for receiving and transmitting various modes of connectivity described herein known to those skilled in the art. User devices 202 and 212, ground infrastructure 203 and 213, and offshore facilities 214a-c, may be capable of receiving and transmitting signals to and from aerial vehicles 201a-b, 211a-c, and 216a-b, and in some cases, to and from each other. Offshore facilities 214a-c may include industrial facilities (e.g., wind farms, oil rigs and wells), commercial transport (e.g., container ships, other cargo ships, tankers, other merchant ships, ferries, cruise ships, other passenger ships), and other offshore applications. In some examples, offshore facilities 214a-c may include offshores stations that are part of a hybrid network.

Hybrid network 200 may support ground-to-vehicle communication and connectivity, as shown between ground infrastructure 203 and aerial vehicle 201b, as well as aerial vehicles 211b-c and ground infrastructure 213. In these examples, aerial vehicles 201b and 211b-c each may exchange data with either or both a ground station (e.g., ground station 114), a tower, or other ground structures configured to connect with a grid, Internet, broadband, and the like. Hybrid network 200 also may support vehicle-to-vehicle (e.g., between aerial vehicles 201a and 201b, between aerial vehicles 211a-c, between aerial vehicles 216a-b, between aerial vehicles 201b and 216b, between aerial vehicles 211b and 216b), satellite-to-vehicle (e.g., between satellite 204 and aerial vehicles 201a-b, between satellite 204 and aerial vehicle 216b), vehicle-to-user device (e.g., between aerial vehicle 201a and user devices 202, between aerial vehicle 211a and user devices 212), and vehicle-to-offshore facility (e.g., between one or both of aerial vehicles 216a-b and one or more of offshore facilities 214a-c) communication and connectivity. In some examples, ground stations within ground infrastructures 203 and 213 may provide core network functions, such as connecting to the Internet and core cellular data network (e.g., connecting to LTE EPC or other communications platforms, and a software defined network system) and performing mission control functions. In some examples, ground infrastructures 203 and 213 also may include towers that may serve as stations in a hybrid network. In some examples, the ground-to-vehicle, vehicle-to-vehicle, and satellite-to-vehicle communication and connectivity enables distribution of connectivity with minimal ground infrastructure. For example, aerial vehicles 201a-b, 211a-c, and 216a-b may serve as base stations (e.g., LTE eNodeB base stations), capable of both connecting to the core network (e.g., Internet and core cellular data network), as well as delivering connectivity to each other, to user devices 202 and 212, and to offshore facilities 214a-c. As such, aerial vehicles 201a-b and 211a-c represent a distribution layer of hybrid network 200. User devices 202 and 212 each may access cellular data and Internet connections directly from aerial vehicles 201a-b and 211a-c.

FIG. 3A is a simplified block diagram of an exemplary computing system forming part of the systems of FIGS. 1A-2, in accordance with one or more embodiments. In one embodiment, computing system 300 may include computing device 301 and storage system 320. Storage system 320 may comprise a plurality of repositories and/or other forms of data storage, and it also may be in communication with computing device 301. In another embodiment, storage system 320, which may comprise a plurality of repositories, may be housed in one or more of computing device 301 (not shown). In some examples, storage system 320 may store state data, commands, flight policies, flight commands, communication stations commands, and other various types of information as described herein. This information may be retrieved or otherwise accessed by one or more computing devices, such as computing device 301 or server computing devices 115a-n in FIGS. 1A-1B, in order to perform some or all of the features described herein. Storage system 320 may comprise any type of computer storage, such as a hard-drive, memory card, ROM, RAM, DVD, CD-ROM, write-capable, and read-only memories. In addition, storage system 320 may include a distributed storage system where data is stored on a plurality of different storage devices, which may be physically located at the same or different geographic locations (e.g., in a distributed computing system such as system 400 in FIG. 3B). Storage system 320 may be networked to computing device 301 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 301 also may include a memory 302. Memory 302 may comprise a storage system configured to store a database 314 and an application 316. Application 316 may include instructions which, when executed by a processor 304, cause computing device 301 to perform various steps and/or functions, as described herein. Application 316 further includes instructions for generating a user interface 318 (e.g., graphical user interface (GUI)). Database 314 may store various algorithms and/or data, including neural networks (e.g., encoding flight policies, as described herein) and data regarding wind patterns, weather forecasts, past and present locations of aerial vehicles (e.g., aerial vehicles 120a-b, 201a-b, 211a-c), sensor data, map information, air traffic information, among other types of data. Memory 302 may include any non-transitory computer-readable storage medium for storing data and/or software that is executable by processor 304, and/or any other medium which may be used to store information that may be accessed by processor 304 to control the operation of computing device 301.

Computing device 301 may further include a display 306, a network interface 308, an input device 310, and/or an output module 312. Display 306 may be any display device by means of which computing device 301 may output and/or display data. Network interface 308 may be configured to connect to a network using any of the wired and wireless short range communication protocols described above, as well as a cellular data network, a satellite network, free space optical network and/or the Internet. Input device 310 may be a mouse, keyboard, touch screen, voice interface, and/or any or other hand-held controller or device or interface by means of which a user may interact with computing device 301. Output module 312 may be a bus, port, and/or other interface by means of which computing device 301 may connect to and/or output data to other devices and/or peripherals.

In some examples computing device 301 may be located remote from an aerial vehicle (e.g., aerial vehicles 120*a-b*, 201*a-b*, 211*a-c*) and may communicate with and/or control the operations of an aerial vehicle, or its control infrastructure as may be housed in avionics chassis 110*a-b*, via a network. In one embodiment, computing device 301 is a data center or other control facility (e.g., configured to run a distributed computing system as described herein), and may communicate with a controller and/or flight computer housed in avionics chassis 110*a-b* via a network. As described herein, system 300, and particularly computing device 301, may be used for planning a flight path or course for an aerial vehicle based on wind and weather forecasts to move said aerial vehicle along a desired heading or within a desired radius of a target location. Various configurations of system 300 are envisioned, and various steps and/or functions of the processes described below may be shared among the various devices of system 300, or may be assigned to specific devices.

Figure 3B:
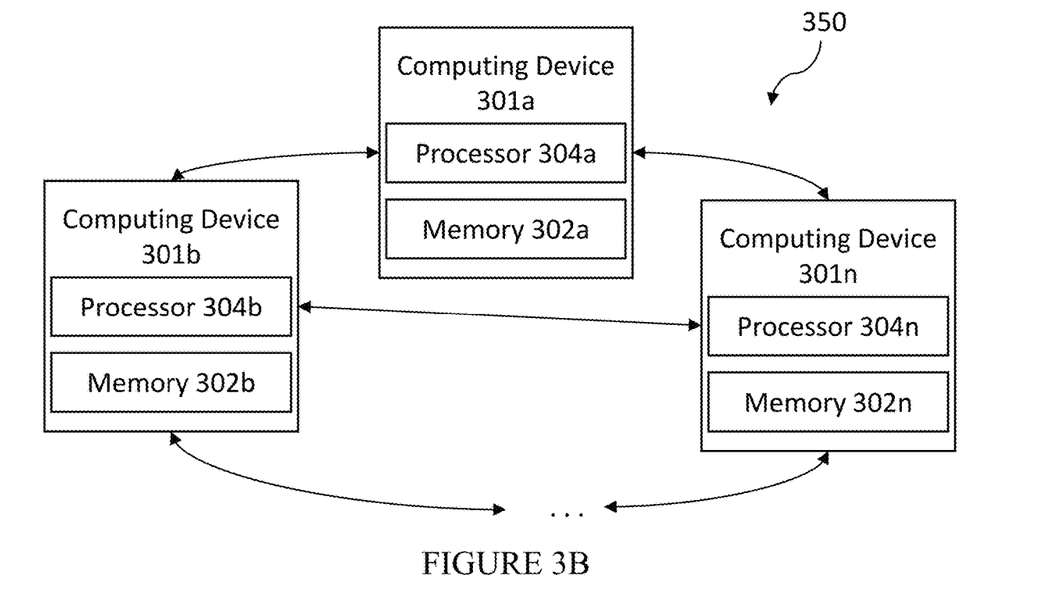
FIG. 3B is a simplified block diagram of an exemplary distributed computing system, in accordance with one or more embodiments.

FIG. 3B is a simplified block diagram of an exemplary distributed computing system, in accordance with one or more embodiments. System 350 may comprise two or more computing devices 301*a-n*. In some examples, each of 301*a-n* may comprise one or more of processors 404*a-n*, respectively, and one or more of memory 402*a-n*, respectively. Processors 404*a-n* may function similarly to processor 304 in FIG. 3, as described above. Memory 402*a-n* may function similarly to memory 302 in FIG. 3, as described above.

Figure 4:
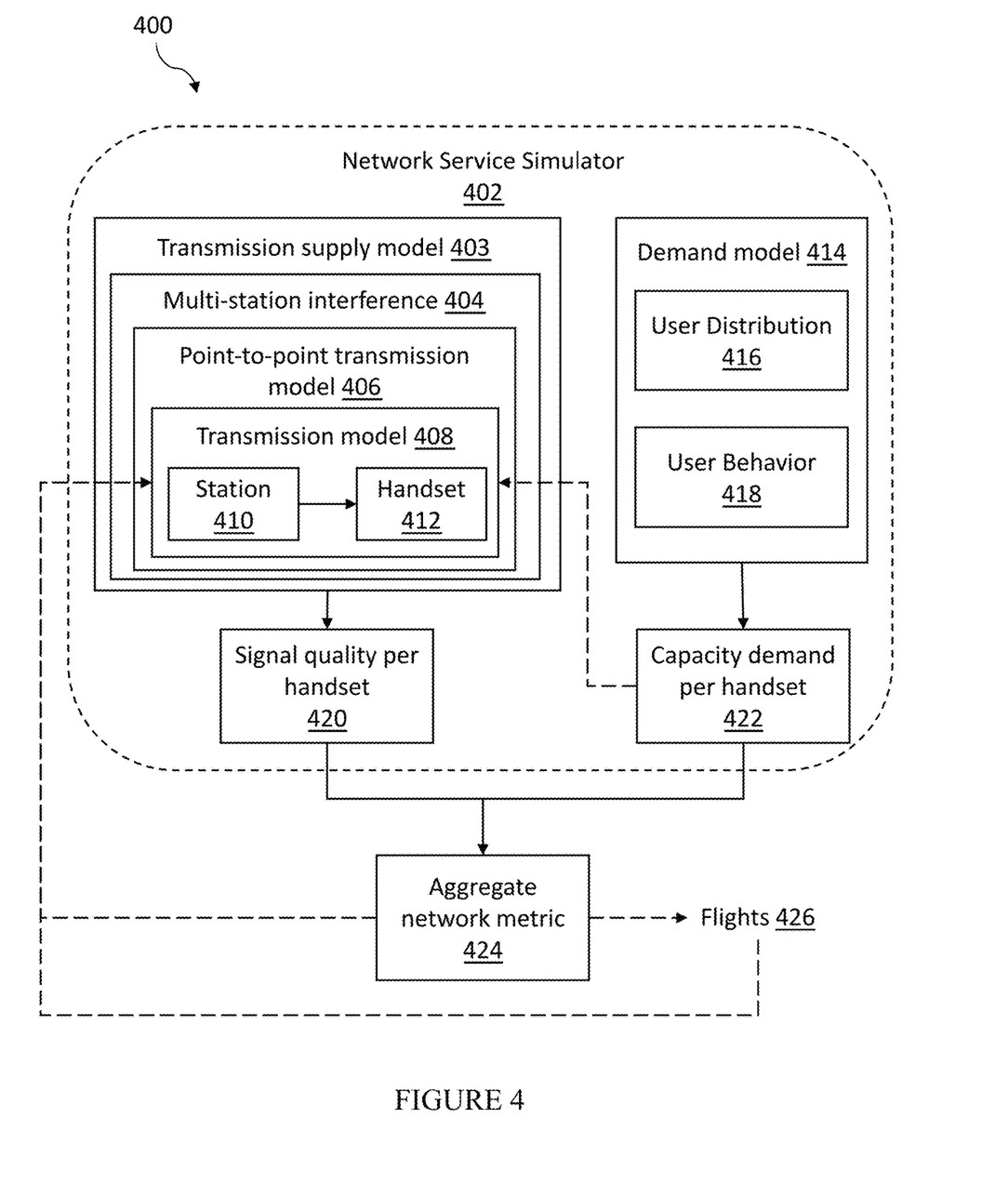
FIG. 4 is a diagram showing an exemplary modeling flow for simulating a dynamic hybrid network, in accordance with one or more embodiments.

FIG. 4 is a diagram showing an exemplary modeling flow for simulating a dynamic hybrid network, in accordance with one or more embodiments. Diagram 400 includes a network service simulator 402 configured to simulate a dynamic hybrid network, including providing aggregate network metric 424 (e.g., throughput, number of users served) to indicate how well network supply (e.g., service coverage) matches with demand. Network service simulator 402 may be implemented using any of the computing systems described herein (e.g., distributed or otherwise) and configured to model network supply at various levels of abstraction. For example, transmission model 408 may be configured to model signal transmission from a station 410 to a handset 412. In some examples, station 410 may include every station in a dynamic hybrid network. In other examples, station 410 may include a subset of the stations in a dynamic hybrid network (e.g., stations located in or near a geographical area of interest (e.g., a country or set of countries, a region, an island chain or group, a body of water), stations providing service to a geographical area of interest or a group of users (e.g., within a country or set of countries, a region, an island chain or group, a body of water), stations communicating by a given communications standard or protocol, stations with a given set of characteristics and/or capabilities). A model of station 410 also may account for a plurality of antenna characteristics, including direction of transmission, transmission frequency, signal transmission coverage (i.e., strength and pattern), location (e.g., latitude-longitude, GPS location), and other characteristics.

In some examples, handset 412 may include all existing handsets in areas served or potentially served by the hybrid network. In other examples, handset 412 may include a subset of existing handsets in areas served or potentially served by the hybrid network (e.g., selected based on one, or a combination, of location (e.g., GPS location, triangulated by a plurality of stations in a network, proximity to or being within a service region of a subset of the stations in a dynamic hybrid network), user information, hardware or software characteristics of a handset (e.g., enabled for a given standard or protocol, installed with a given application, installed with a given hardware component and/or configuration, installed with a given operating system). Based on transmission model 408, a point-to-point transmission model 406 may be derived based on a station (i.e., one point) to handset density (i.e., another point) transmission rate, volume, or other measurement or extrapolation. The handset density may comprise an abstract representation of handset density at a location (e.g., including or in proximity to a station). The point-to-point transmission model 406 may represent a global scale or a subset thereof (e.g., country, continent, region, group of islands), for example, depending on limits that may have been placed on transmission model 408. Multi-station interference 404 may be modeled based on point-to-point transmission model 406, and may provide a model of interference between fixed stations (e.g., ground infrastructure 203 and 213 in FIG. 2), semi-fixed stations (e.g., offshore stations on relatively fixed offshore facilities 214*a-*214*b* in FIG. 2) and current and/or forecasted locations of moving stations (e.g., as may be carried on aerial vehicles 120*a-b* in FIGS. 1A-1B and 201*a-b*, 211*a-c*, and 216*a-b* in FIG. 2, offshore facilities 214*c* in FIG. 2, and the like). Multi-station interference 404 may be used to simulate a transmission supply model 403 comprising a signal quality per handset metric 420 (e.g., SINR, RSSI, RSRP, RSRQ, or other metric). In some examples, simulating transmission supply model 403 may include performing a regression analysis based on one or both of point-to-point transmission model 406 and multi-station interference 404 over actual and simulated moving station locations over time (e.g., based on actual and simulated vehicle trajectories). In other examples, simulating transmission supply model 403 may include providing one or both of point-to-point transmission model 406 and multi-station interference 404 to a machine learning model trained to determine one or more transmission supply metrics (e.g., signal quality per handset metric 420). In some examples, multi-station interference 404 may incorporate or account for actual antenna characteristics of stations (e.g., station 410) in the hybrid network being modeled. In other examples, multi-station interference 404 may be based on average, estimated or assumed antenna characteristics of stations (e.g., station 410), and actual antenna characteristics may be considered or reconsidered in simulating transmission supply model 403 to produce signal quality per handset metric 420. Transmission supply model 403 may be simulated at each time step in a time series providing a depiction of transmission supply across a dynamic hybrid network comprising a plurality of moving stations (e.g., a mesh network being carried by aerial vehicles).

Demand model 414 may be generated based on user distribution 416 data and user behavior 418 data (e.g., anonymized usage data). Demand model 414 may be configured to output a capacity demand per handset 422 (e.g., at each point in a plurality of points representing a geographical location or area of interest). User behavior 418 may be geographically distinct (e.g., differ significantly from one area or country to another). Demand model 414 may represent a static snapshot of demand (e.g., at a given time, either globally or for a given location) or may vary in time (e.g. a day-night, weekday-weekend, or other periodic cycle, updated based on periodic or ad hoc updates to user distribution 416 and/or user behavior 418 data).

Demand model 414 may output capacity demand per handset 422, which may be combined with a transmission supply metric (e.g., signal quality per handset 420) output from transmission supply model 403 to produce an aggregate network metric 424. In some examples, aggregate network metric 424 may include a one or more of a throughput value, a number of users served, and other indication of how well network supply (e.g., broadband and/or cellular service coverage) matches with demand. In some examples, aggregate network metric 424 may be refreshed at each time step in a time series based on a refreshed transmission supply model 403 based on updated current or most recent locations and antenna characteristics of moving stations in a mesh network, even when demand model 414 represents a static or cyclical representation of capacity demand per handset 422 (i.e., that is not updated in real time or using current or recent user distribution 416 data and/or user behavior 418 data). In some examples, a self-consistent loop adjusting transmission model 408 to actual or modeled demand may be implemented by providing capacity demand per handset 422 back to transmission model 408, such that a station 410 load factor may be computed as a ratio between station 410's actual capacity supply based on capacity demand per handset 422 and station 410's absolute maximum capacity. In some examples, supplied capacity may be capped either by an absolute maximum capacity or by demand requested by demand model 414 (e.g., user demand model). Where station 410's supplied capacity (i.e., output power) is dynamic, adjusted according to updated outputs from demand model 414, transmission model 408 may change accordingly leading to adjustments in point-to-point transmission model 406 and multi-station interference 404. This feedback from demand model 414 may be provided directly or indirectly (e.g., as part of aggregate network metric 424).

In some examples, aggregate network metric 424 may be provided to and/or impact flights 426 (i.e., of aerial vehicles in a fleet of aerial vehicles in flight carrying one or more moving stations in the network of station(s) 410). For example, aggregate network metric 424 may be used by a flight controller to cause changes to one or more of flights 426 to improve throughput (e.g., change a trajectory of a vehicle carrying a station, change a direction of transmission, change a transmission strength). Updated positioning, directionality, transmission strength, among other station characteristics, may also be fed back to transmission model 408 (e.g., providing changes to station 410).

Figure 5A:
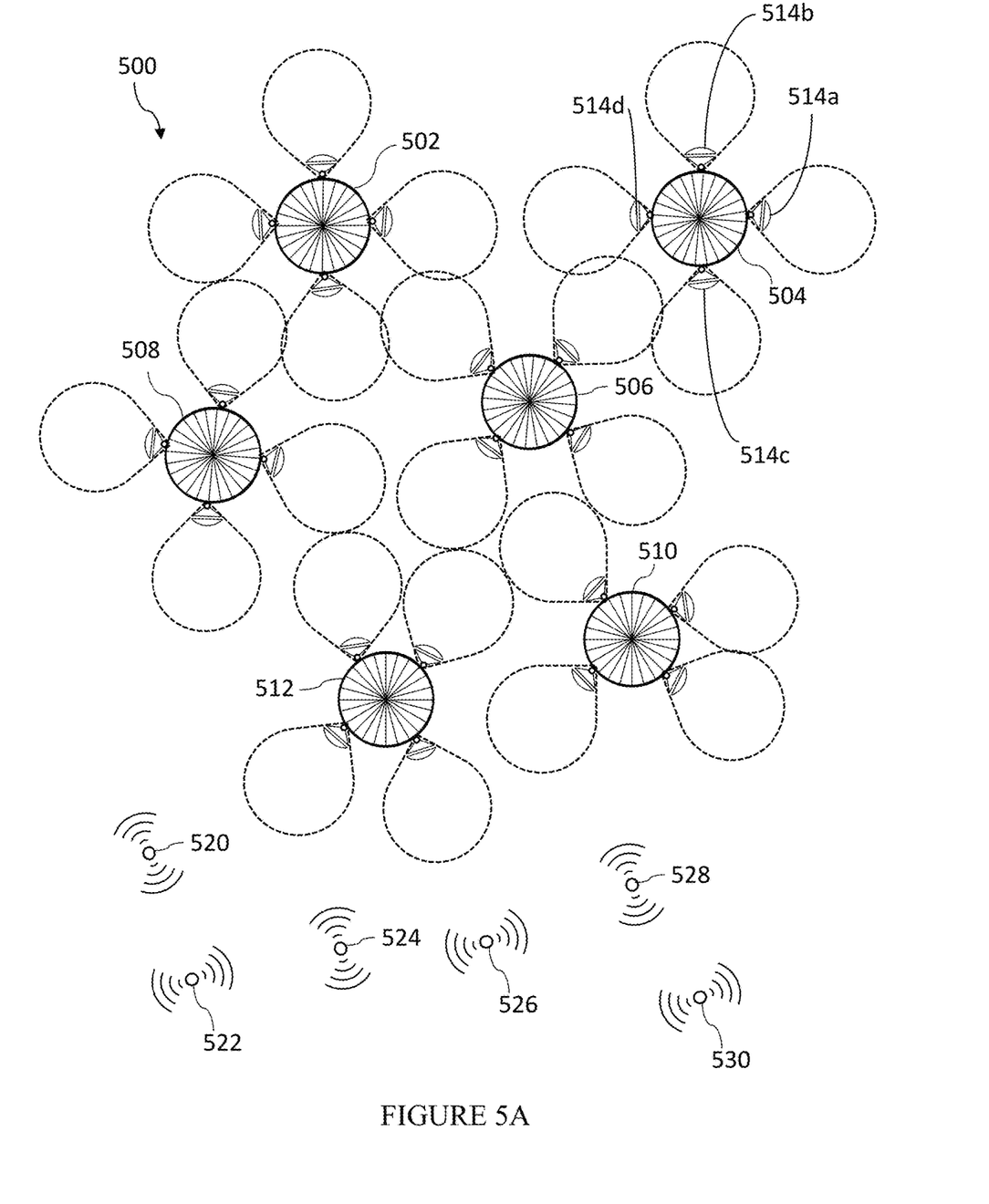
FIGS. 5A-5B are diagrams of exemplary dynamic hybrid networks with coordinated service coverage, in accordance with one or more embodiments.
Figure 5B:
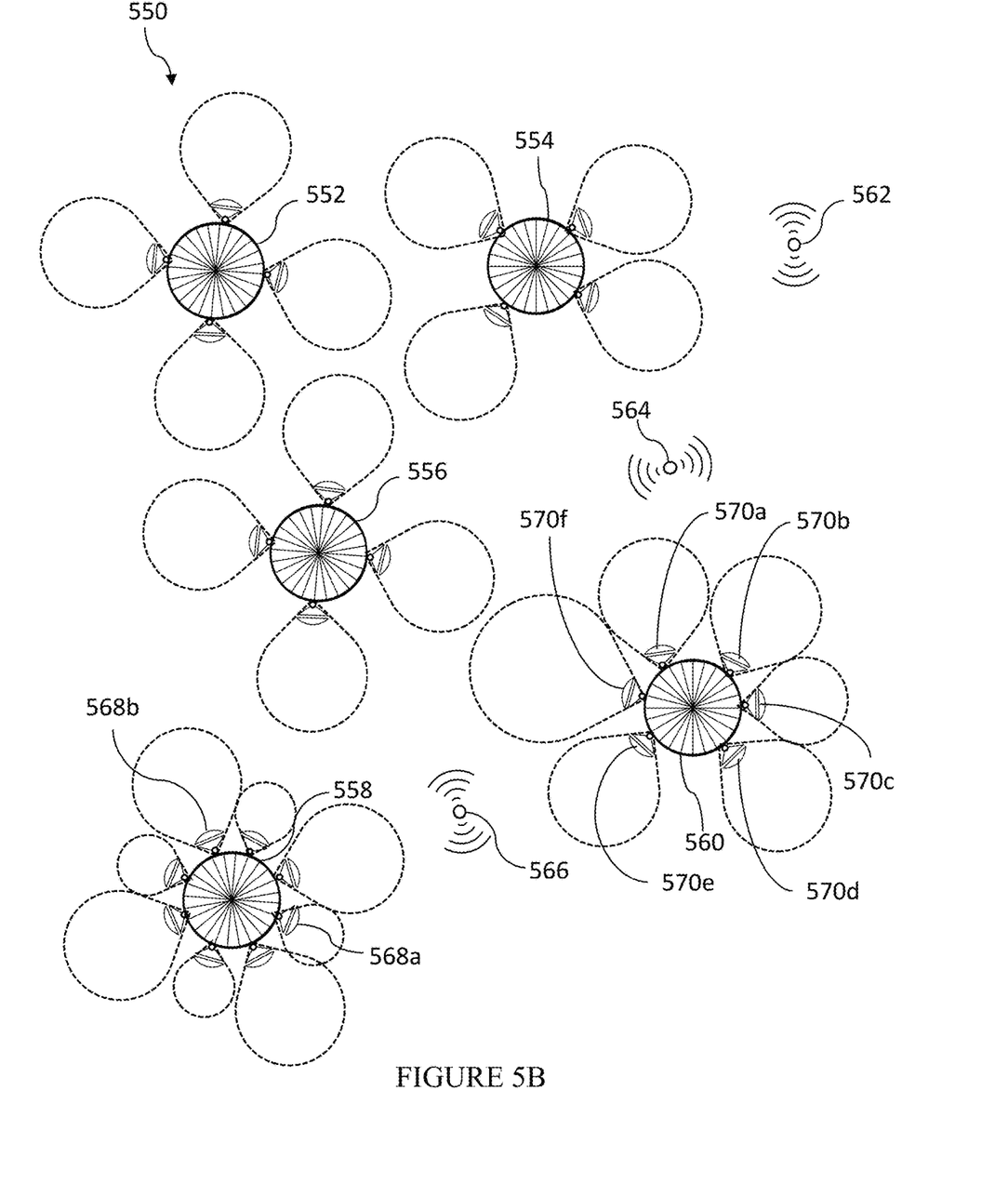

FIGS. 5A-5B are diagrams of exemplary dynamic hybrid networks with coordinated service coverage, in accordance with one or more embodiments. In FIG. 5A, network 500 depicts a plurality of exemplary aerial vehicles 502-512, each carrying a plurality of moving stations (e.g., stations 514a-d on aerial vehicle 504) comprising a mesh network, providing service to an area adjacent to, and unserved by, a group of fixed stations 520-530, which may comprise towers on the ground or other types of ground stations. In some examples, fixed stations 520-530 may be configured to transmit and receive radio waves in two directions, as shown. In other examples, fixed stations 520-530 may be configured to transmit and receive radio waves in three or more directions.

Dotted lobes show transmission patterns of each of the moving stations on each of aerial vehicles 502-512. In some examples, aerial vehicles 502-512 may receive commands from a control and navigation system configured to cause aerial vehicles 502-512 to travel (e.g., to move up, down, or stay at a given altitude to be carried by winds) in patterns or on trajectories optimized based on metrics (e.g., aggregate network metric 424) and/or maps of transmission supply and demand models of a dynamic hybrid network comprising a mesh network of moving stations on aerial vehicles 502-512 and fixed stations 520-530. Thus, in some examples, one or more of aerial vehicles 502-512 may be at varying altitudes.

As shown, one or more stations on aerial vehicles 502-512 may have directional variability (e.g., stations on aerial vehicles 502-508 are largely facing directly out from each respective vehicle approximately 90 degrees from each adjacent station, whereas stations on aerial vehicles 510-512 show gimbals facing in a direction that is more or less than 90 degrees from each adjacent station) in order to optimize coverage in a desired area.

The moving stations in FIG. 5A are shown to have largely uniform transmission capacities (e.g., all fully powered, or all powered to a same or similar threshold). In some examples, as shown in FIG. 5B, there may be variability not just in transmission direction of the moving stations, but also in transmission capacity (i.e., strength). Network 550 comprises a mesh network of moving stations (e.g., stations 568a-b, 570a-f) on aerial vehicles 552-558, providing service to complement sparsely located fixed stations 562-566 (e.g., located in an area with terrain not conducive to building dense ground infrastructure). The dynamic hybrid network model described herein may include modeling coverage of fixed stations 562-566 to avoid interference by the moving stations. In some examples, each station's transmission strength may be adjusted (e.g., controlled remotely or self-adjusting based on demand input) higher, lower, on and off, due to various factors (e.g., minimize interference, pockets of high or low demand in a service region as indicated by a demand model (e.g., demand model 414), proximity to a border (e.g., between an in-service area (e.g., region, country, state, sovereignty) and out-of-service area, edge or buffer zone of a restricted area). Each of the moving stations in network 550 may be selectively turned off, adjusted in transmission strength, and altered in direction.

In some examples, the stations in networks 500 and 550 may form a self-organizing network (SON), wherein they may communicate their location, transmission strength, outputs from supply and demand models, and other information to each other, and in response, adjust their own antenna characteristics to maximize the number of users to serve.

Example Methods

Figure 6:
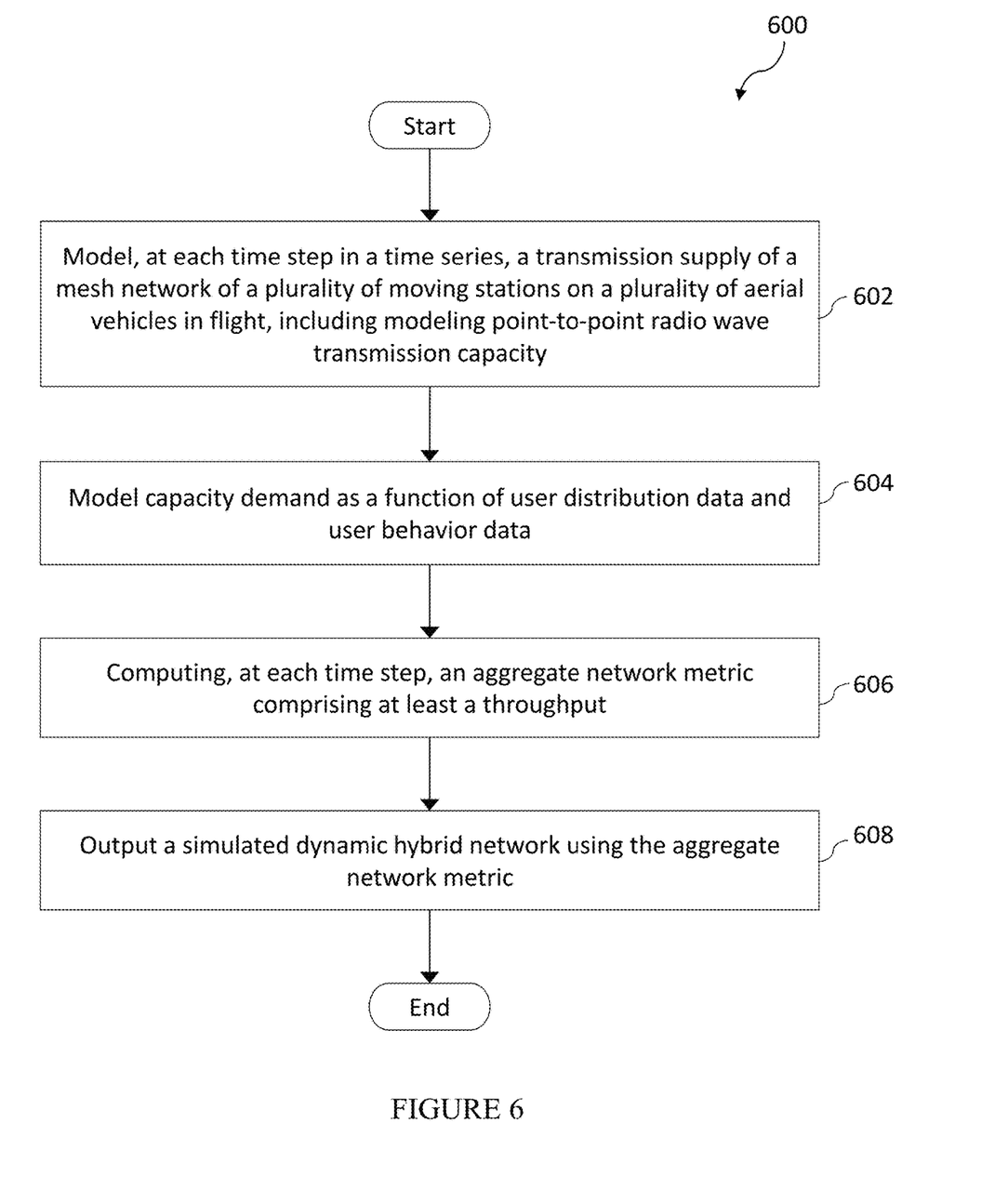
FIG. 6 is a flow diagram illustrating a method for simulating a dynamic hybrid network, in accordance with one or more embodiments.

FIG. 6 is a flow diagram illustrating a method for simulating a dynamic hybrid network, in accordance with one or more embodiments. Method 600 begins with modeling, at each time step in a time series, a transmission supply of a mesh network of a plurality of moving stations on a plurality of aerial vehicles in flight, including modeling point-to-point radio wave transmission capacity at step 602. In some examples, the dynamic hybrid network may comprise the mesh network and one or more fixed stations. In some examples, the transmission supply of the mesh network may be modeled relative to the transmission supply of one or more fixed stations. The plurality of aerial vehicle may comprise more than one type of aerial vehicle (i.e., a heterogeneous fleet) or one type of aerial vehicle (i.e., homogeneous fleet). In some examples, the mesh network may comprise a homogeneous network of LTE stations. In other examples, the mesh network may comprise a heterogeneous network of two or more types of stations. In some examples, the transmission supply may be modeled based on a model of multi-station interference among the mesh network of the plurality of moving stations, which may be based on the point-to-point radio wave transmission capacity. In some examples, the model of multi-station interference also may account for interference between the mesh network and one or more fixed stations.

A capacity demand may be modeled as a function of user distribution data and user behavior data at step 604. In some examples, the capacity demand model may represent a static or cyclical, and abstracted, representation of capacity demand per handset (i.e., not updated in real time or using current or recent user distribution data and/or user behavior data). At each time step, an aggregate network metric may be computed at step 606, the aggregate network metric comprising at least a throughput. The aggregate network metric also may be expressed in terms of a number of users being served, or other indication of how network demand is being met by network supply. In some examples, the aggregate network metric may be based on a signal quality per handset output from modeling the transmission supply and a capacity demand per handset output from modeling the capacity demand. The aggregate network metric may be refreshed at each time step in a time series based on a refreshed transmission supply model based on updated current or most recent locations and antenna characteristics of moving stations in a mesh network.

In some examples, a simulated dynamic hybrid network may be output using the aggregate network metric, the simulated dynamic hybrid network being represented using a heatmap, chart, spreadsheet, table, list, or other visual representation. In some examples, the simulated dynamic hybrid network may be represented using a series of static outputs. In other examples, the simulated dynamic hybrid network may be represented in a dynamic (i.e., changing with time) and/or interactive map or other visual interface.

Figure 7:
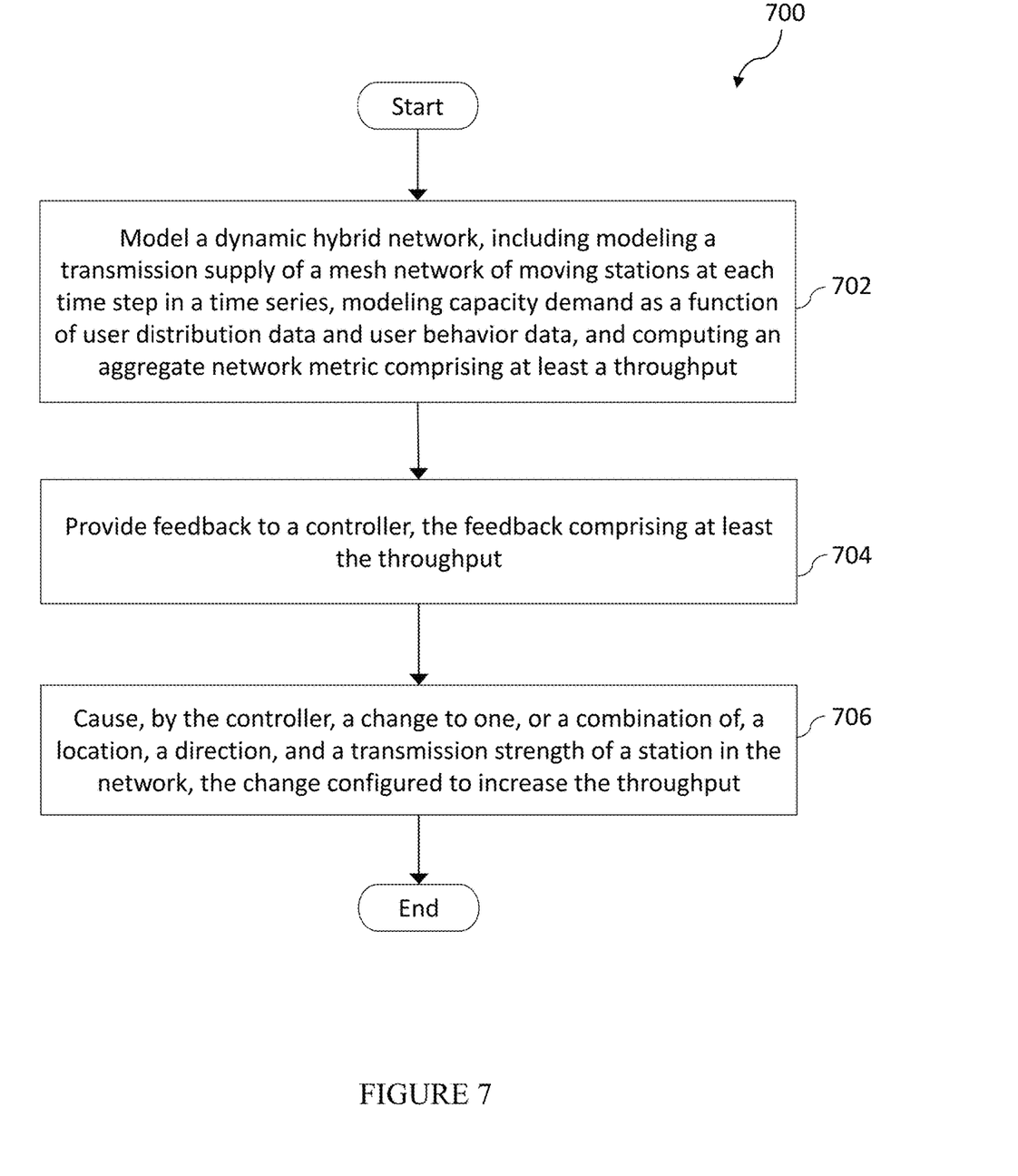
FIG. 7 is a flow diagram illustrating a method for optimizing throughput of a dynamic hybrid network, in accordance with one or more embodiments.

FIG. 7 is a flow diagram illustrating a method for optimizing throughput of a dynamic hybrid network, in accordance with one or more embodiments. Method 700 begins with modeling a dynamic hybrid network at step 702, which may include modeling a transmission supply of a mesh network of moving stations at each time step in a time series, modeling capacity demand as a function of user distribution data and user behavior data, and computing an aggregate network metric comprising at least a throughput. In some examples, modeling the dynamic hybrid network may include performing a regression analysis over a series of locations from an actual vehicle trajectory. In other examples, modeling the dynamic hybrid network may include performing a regression analysis over a series of locations from a simulated vehicle trajectory. As described above, modeling the transmission supply of the mesh network may include modeling a point-to-point transmission between a plurality of moving stations in the mesh network and a handset density. Such moving stations may be carried by an aerial vehicle, which may be part of a fleet of aerial vehicles.

Feedback may be provided to a controller at step 704, the controller being configured to provide commands to one or both of an aerial vehicle and a moving station, or one or more components thereof. The controller may cause a change to one, or a combination of, a location, direction, and transmission strength of a station in the network at step 706, the change configured to increase the throughput. In some examples, the controller also may cause a change to other antenna characteristics. In still other examples, another controller may be configured to navigate an aerial vehicle in response to the feedback as well. In some examples, one or more of the moving stations in the mesh network may form a self-organizing network (SON), each station configured to adjust an antenna characteristic in response to information received from another station. In some examples, the controller may be configured to shut-off, reduce transmission strength, or otherwise configure or alter the characteristics of a station based on the feedback in view of other rules or parameters (e.g., overriding considerations such as traveling towards or in proximity to restricted zones (i.e., no-fly zones), out-of-network regions or countries, and the like).

While specific examples have been provided above, it is understood that the present invention can be applied with a wide variety of inputs, thresholds, ranges, and other factors, depending on the application. For example, the time frames and ranges provided above are illustrative, but one of ordinary skill in the art would understand that these time frames and ranges may be varied or even be dynamic and variable, depending on the implementation.

As those skilled in the art will understand, a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for simulating a dynamic hybrid network, the method comprising:
    modeling, at each time step in a time series, a transmission supply of a mesh network of a plurality of moving stations on a plurality of aerial vehicles in flight, including modeling point-to-point radio wave transmission capacity;
    modeling capacity demand as a function of user distribution data and user behavior data, wherein modeling the capacity demand results in a cyclical representation or a static representation of a capacity demand per handset; and
    computing, at each time step, an aggregate network metric for the dynamic hybrid network comprising at least a throughput, wherein the aggregate network metric is refreshed at each time step in the time series based on the transmission supply refreshed based on (1) at least one of an updated current location or most recent location and (2) antenna characteristics of the plurality of moving stations in the mesh network.

2. The method of claim 1, wherein the dynamic hybrid network comprises the mesh network and one or more fixed stations.

3. The method of claim 2, further comprising modeling the transmission supply of the mesh network relative to the transmission supply of the one or more fixed stations.

4. The method of claim 1, wherein the plurality of aerial vehicles comprises more than one type of aerial vehicle.

5. The method of claim 1, wherein the mesh network comprises a homogeneous network of LTE stations.

6. The method of claim 1, wherein the mesh network comprises a heterogeneous network of two or more types of stations.

7. The method of claim 1, further comprising modeling multi-station interference among the mesh network of the plurality of moving stations.

8. The method of claim 1, further comprising modeling multi-station interference between the mesh network and one or more fixed stations.

9. The method of claim 1, wherein the aggregate network metric is based on a signal quality per handset output from modeling the transmission supply and a capacity demand per handset output from modeling the capacity demand.

10. The method of claim 1, further comprising outputting a simulated dynamic hybrid network using the aggregate network metric.

11. The method of claim 10, wherein the simulated dynamic hybrid network is represented using a heatmap.

12. A method for optimizing throughput of a dynamic hybrid network, the method comprising:
modeling a dynamic hybrid network, including modeling a transmission supply of a mesh network of moving stations at each time step in a time series, modeling capacity demand as a function of user distribution data and user behavior data, and computing an aggregate network metric comprising at least a throughput;
providing feedback to a controller, the feedback comprising at least the throughput;
and causing, by the controller, a change to one, or a combination of, a location, direction, and
transmission strength of a station in the network, the change configured to increase the throughput, wherein the station is part of a self-organizing network (SON) and is configured to adjust an antenna characteristic in response to information received from another station, and the information includes the modeled transmission supply and the modeled capacity demand of the another station.

13. The method of claim 12, wherein modeling the dynamic hybrid network comprises performing a regression analysis over a series of locations from an actual vehicle trajectory.

14. The method of claim 12, wherein modeling the dynamic hybrid network comprises performing a regression analysis over a series of locations from a simulated vehicle trajectory.

15. The method of claim 12, wherein modeling the transmission supply comprises modeling point-to-point transmission between a plurality of stations in the dynamic hybrid network and a handset density.

16. The method of claim 12, wherein the station is located on an aerial vehicle.

17. The method of claim 16, wherein the aerial vehicle is part of a fleet of aerial vehicles carrying the mesh network of moving stations.

* * * * *